United States Patent
Marin Martinod et al.

(10) Patent No.: US 8,955,305 B2
(45) Date of Patent: Feb. 17, 2015

(54) SELF-CALIBRATION METHOD FOR THE ELECTRIC JACKS OF A TURBOJET NACELLE

(75) Inventors: Thierry Marin Martinod, Nesles la Vallee (FR); Hakim Maalioune, Orgeval (FR)

(73) Assignee: Aircelle, Gonfreville l'Orcher (FR)

( * ) Notice: Subject to any disclaimer, the term of this patent is extended or adjusted under 35 U.S.C. 154(b) by 1094 days.

(21) Appl. No.: 12/528,945

(22) PCT Filed: Feb. 1, 2008

(86) PCT No.: PCT/FR2008/000125
§ 371 (c)(1),
(2), (4) Date: Aug. 27, 2009

(87) PCT Pub. No.: WO2008/113900
PCT Pub. Date: Sep. 25, 2008

(65) Prior Publication Data
US 2010/0107598 A1    May 6, 2010

(30) Foreign Application Priority Data
Feb. 28, 2007   (FR) ..................... 07 01417

(51) Int. Cl.
*F02K 1/76*   (2006.01)

(52) U.S. Cl.
CPC ..................... *F02K 1/763* (2013.01)
USPC ..... 60/226.2; 60/226.1; 60/226.3; 244/110 B; 239/265.19; 239/265.25; 239/265.29; 73/112.01

(58) Field of Classification Search
USPC ....... 60/226.1, 226.2, 226.3, 204; 244/110 B; 239/265.19, 265.25, 265.27, 265.29; 73/112.01
See application file for complete search history.

(56) References Cited

U.S. PATENT DOCUMENTS

| | | | | |
|---|---|---|---|---|
| 6,109,021 A  * | 8/2000 | Hanley et al. | ................... | 60/204 |
| 6,167,694 B1 * | 1/2001 | Davies | ................ | 60/226.2 |
| 6,564,541 B2 * | 5/2003 | Ahrendt | .................. | 60/204 |
| 6,684,623 B2 * | 2/2004 | Langston et al. | ............ | 60/226.2 |
| 6,771,032 B2 * | 8/2004 | Cox-Smith et al. | ............. | 318/85 |
| 6,926,234 B2 * | 8/2005 | Colotte et al. | ............ | 244/110 B |
| 7,370,468 B2 * | 5/2008 | Colotte et al. | ............... | 60/226.2 |
| 2003/0159429 A1 | 8/2003 | Langston et al. | | |

FOREIGN PATENT DOCUMENTS

| | | |
|---|---|---|
| EP | 0 843 089 | 5/1998 |
| FR | 2 872 222 | 12/2005 |
| FR | 2 872 223 | 12/2005 |
| WO | 00/05497 | 2/2000 |
| WO | 03/010430 | 2/2003 |

OTHER PUBLICATIONS

International Search Report; PCT/FR2008/000125; Dec. 8, 2008.

* cited by examiner

*Primary Examiner* — Phutthiwat Wongwian
*Assistant Examiner* — Steven Sutherland
(74) *Attorney, Agent, or Firm* — Brinks Gilson & Lione

(57) ABSTRACT

The invention relates to a method for the self-calibration of electric jacks (6a, 6b) capable of actuating a mobile member (2) of a turbojet nacelle (1) and connected to at least one position measuring member, characterized in that it comprises the steps of: moving the jack(s) into a retracted position corresponding to a first position of the mobile member, storing one or more position values fed back by the position measuring member for the jack(s) in said retracted position; moving the jack(s) into an extended position corresponding to a second position of the mobile member; storing one or mom position values fed back by the position measuring member for the jack(s) in said extended position.

11 Claims, 2 Drawing Sheets

SELF-CALIBRATION METHOD FOR THE ELECTRIC JACKS OF A TURBOJET NACELLE

TECHNICAL FIELD OF THE INVENTION

The present invention relates to a method of self-calibration of electric jacks fitted to a turbojet engine thrust reverser.

BRIEF DESCRIPTION OF RELATED ART

The role of a thrust reverser when an airplane is landing is to improve the braking capacity of the airplane by redirecting forward at least some of the thrust generated by the turbojet engine. In this phase the reverser closes off the gas exhaust pipe and directs the engine exhaust flow toward the front of the nacelle, thereby generating a back-thrust which adds to the braking of the wheels of the airplane.

The means employed to achieve this reorientation of the flow vary according to the type of reverser. However, in all instances, the structure of a reverser comprises moving cowls that can be moved between, on the one hand, a deployed position in which they open up within the nacelle a passage intended for the deflected flow and, on the other hand, a retracted position in which they close off this passage. These moving cowls may also fulfill a deflection function or simply fulfill a function of activating other deflection means.

In cascade-type reversers for example, the moving cowls slide along rails so that as they retreat during the opening phase, they uncover cascades of deflection vanes positioned in the thickness of the nacelle. A system of link rods connects this moving cowl to blocking doors which deploy inside the exhaust duct and block off the direct-flow outlet. In door-type reversers by contrast, each moving cowl pivots so as to block off the flow and deflect it and therefore plays an active part in this reorientation.

In recent years, the hydraulic or pneumatic jacks that have conventionally been used to actuate these moving cowls have started to be replaced with electric jacks so as to avoid the need to install a pressurized fluid supply system that requires a great deal of maintenance and allow improved control of the opening and closing of said moving cowls.

Patent applications EP 0 843 089, FR 2 872 222 and FR 2 872 223 inter alia, deal with these electric actuating systems.

There is a problem with installing these electric actuators and this is that as they are being installed, the electric jacks need to be set and their position calibrated to take account of the mechanical spread on the nacelle and to take account of the clearances and gaps involved in assembly. This procedure is lengthy and painstaking and has to be repeated each time the jacks are removed and refitted following, for example, a maintenance operation on the reverser. The maintenance operators, who are not the same as the specialist assembly operators, therefore have also to gain proficiency in this electric jack calibration procedure.

At the present time, when the jacks are being installed, the operator makes do with physically mounting these jacks without worrying about the mechanical tolerances on the nacelle. Quite clearly, the stroke of the jacks is predefined in such a way as to cover the worst case. Installing them in this way is therefore imprecise and the installation can be improved vastly in order very precisely to adapt the stroke of the jacks to suit each nacelle.

BRIEF SUMMARY OF THE INVENTION

The invention overcomes the aforementioned disadvantages and the invention therefore comprises a method of self-calibration of a moving part of a turbojet engine nacelle comprising at least one electric jack associated with at least one position-measuring member, where the invention generally comprises:
- bringing the moving part and the associated jack or jacks into the retracted position, corresponding to a first position of the moving part,
- logging one or more position values returned by the position-measuring member for the jack or jacks in said retracted position,
- bringing the moving part and the associated jack or jacks into the deployed position, corresponding to a second position of the moving part,
- logging one or more position values returned by the position-measuring member for the jack or jacks in said deployed position.

Thus, by electronically logging the deployed and retracted positions of the electric jacks, corresponding electric stops are defined on the basis of actual mechanical stops. In this way, unlike current practice which is to adapt the mechanical stops of the jacks to suit the mechanical spread on the nacelle, the deployment and retraction movements of the jacks can be performed on the basis of electronic stops that have been defined simply and precisely on the basis of the actual mechanical spread on each nacelle and moving part concerned.

Moreover, by defining these positions electronically, their values can be used by a controller to apply a deployment or retraction strategy in order, for example, automatically to reduce the rate of travel of the jacks just before they reach an end.

According to a first embodiment, the jack or jacks are actuated manually.

According to a second embodiment, the jack or jacks are actuated electrically.

Advantageously, the retracted and deployed positions of the jacks are detected automatically by detecting mechanical stops.

According to a first alternative form of embodiment, the detection of the mechanical stops is performed by measuring the variation in current drawn by an electric motor actuating the jack or jacks.

According to a second alternative form of embodiment, the detection of the stops is performed by measuring the rate at which the jacks deploy or retract.

As a preference, the rate of deployment or of retraction is obtained by differentiating the position value returned by the position-measuring member.

Quite clearly, any other method of automatically detecting the stops using a measurable parameter may be employed.

As a preference, the position-measuring member is a resolver. Quite obviously, it is possible to use any other position-measuring device known to those skilled in the art, such as optical encoders, potentiometers, etc.

Advantageously, the logged retracted and deployed position values are corrected by applying a margin of error. What happens is that because the position measurement is taken as the jack reaches its deployed stop or its retracted stop, it will be advantageous to define an electronic stop that is very slightly before the mechanical stop so as to reduce or even avoid the impact of hitting the stop which could, ultimately, carry the risk of weakening the mechanical parts, while at the same time ensuring optimum closure or deployment. The margin of error to be applied will be readily determined by those skilled in the art.

The present invention also relates to a thrust reverser comprising at least one moving cowl that can be moved under the action of at least one electromechanical member of the electric jack type, characterized in that it comprises an instrumentation and control interface capable of implementing a method according to the invention. Advantageously, the control interface is connected to a turbojet engine control unit and in that the self-calibration method can be activated from the cockpit.

BRIEF DESCRIPTION OF THE DRAWINGS

Implementation of the invention will be better understood with the aid of the detailed description given hereinbelow with reference to the attached drawing in which.

DETAILED DESCRIPTION OF THE INVENTION

Before describing one embodiment of the invention in detail, it is important to specify that this invention is not limited to one particular type of moving part. Although it has been illustrated in the form of a cascade-type reverser, it could be implemented with reversers of different designs, particularly of the door type, or could alternatively be applied to any kind of moving cowl fitted to a turbojet engine nacelle.

Figure 1:
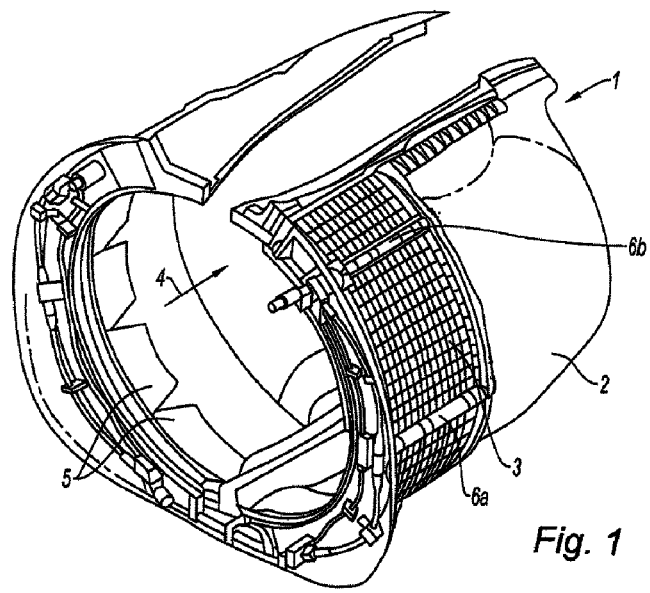
FIG. 1 is a partial perspective schematic view of a nacelle incorporating a cascade-type thrust reverser.

FIG. 1 shows a partial schematic view of a nacelle incorporating a thrust reverser 1. The turbojet engine is not depicted. This thrust reverser 1 has a structure comprising two semicircular moving cowls 2 capable of sliding to uncover cascades 3 of deflection vanes positioned between the moving cowls 2 and a section for the passage of the air flow 4 that is to be deflected. Blocking doors 5 are positioned inside the structure so as to be able to pivot and move from a position in which they do not impede the passage of the air flow 4 into a position in which they block this passage. In order to coordinate the opening of the moving cowls 2 with a blocking-off position of the blocking doors 5, the latter are mechanically connected to the moving cowl 2 by hinges and to the fixed structure by a system of link rods (not depicted).

The moving cowls 2 are made to move along the outside of the structure by a set of jacks 6a, 6b mounted on a front frame which houses an electric motor 7 and flexible transmission shafts 8a, 8b connected to the jacks 6a, 6b respectively in order to actuate them.

Figure 2:
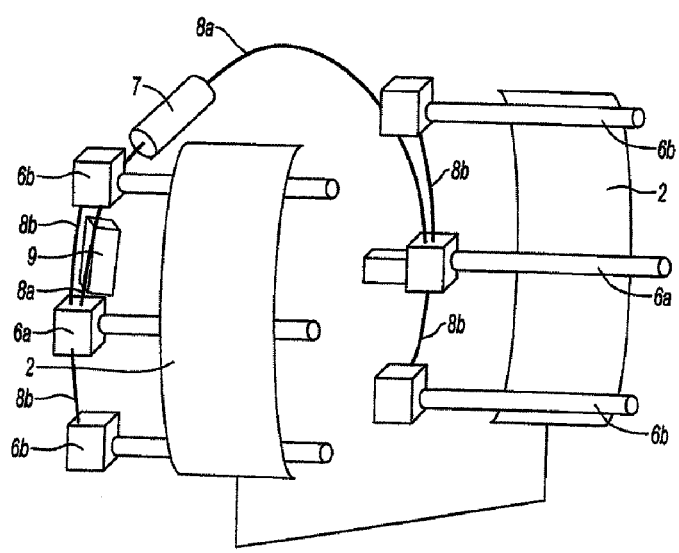
FIG. 2 is a schematic depiction of the moving cowls and of their actuating system.

The system for actuating the moving cowls 2 is depicted on its own in FIG. 2. Each moving cowl 2 can undergo a translational movement under the action of three jacks 6a, 6b comprising one central jack 6a and two additional jacks 6b, actuated by a single electric motor 7 connected to a control interface 9. The power delivered by the electric motor 7 is first of all distributed to the central jacks 6a via two flexible transmission shafts 8a, and is then distributed to the additional jacks 6b by flexible transmission shafts 8b.

Moreover, each jack 6a, 6b is equipped with a position-measuring member comprising a "resolver" and continuously delivering at least one value making it possible to determine the position of the rod of the corresponding jack 6a, 6b. More specifically, a "resolver" is an angular-position sensor. Thus, it is necessary to add to it a revolution counter in order to have an absolute measurement of the position of the rod of the jack 6a, 6b. The position-measuring member therefore returns a value representative of the number of revolutions performed by the drive rod and an angular measurement value. These two values make it possible to determine precisely the length of deployment of the rod of the jack 6a, 6b.

Figure 3:
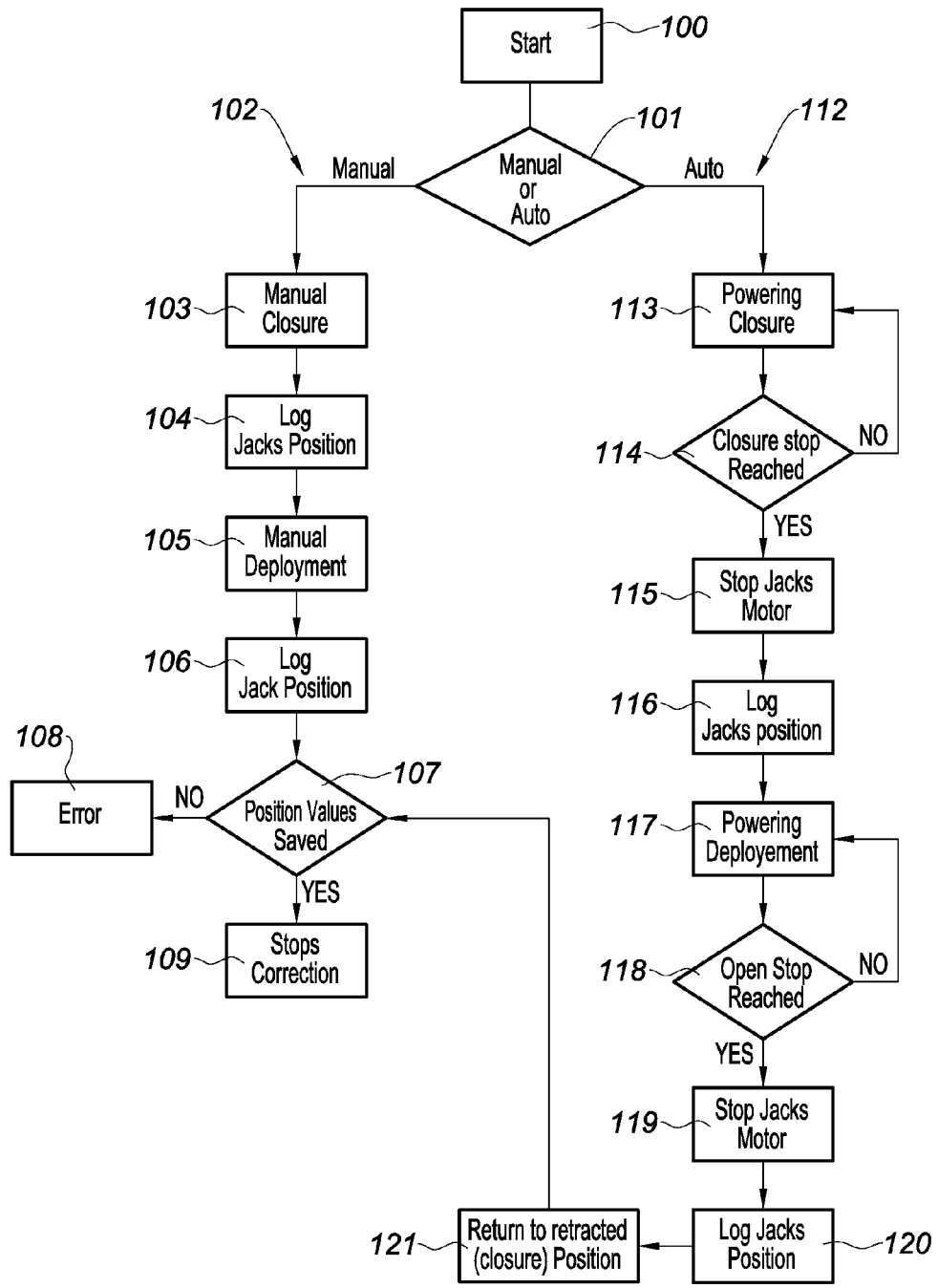
FIG. 3 is a diagram representing the stages of operation of a control method according to the invention for calibrating a thrust reverser actuating system.

A diagram showing the steps of a method according to the invention for the calibration of the jacks is depicted in FIG. 3.

First of all, the calibration procedure is started by a command 100 which comprises applying power to the electronic elements, particularly the position sensors that sense the positions of the jacks 6a, 6b. This command can be issued from the airplane cockpit or from a nacelle electronic controller.

This command is followed by a checking step 101 which checks whether the operator has selected a manual or automatic calibration mode.

In the case of manual calibration 102, the operator manually closes the reverser during a step 103. In so doing he places the jacks 6a, 6b in the retracted position.

The operator then asks the controller to log the position values from the resolvers of each jack 6a, 6b during a step 104. These values determine an electric retraction stop.

The operator then manually brings the reverser into the deployed position during a step 105. In so doing he places the jacks 6a, 6b in the deployed position.

The operator then asks the controller to log the position values from the resolvers of each jack 6a, 6b during a step 106. These values determine an electric deployment stop.

Once the deployed and retracted position values have been logged, the controller proceeds to a step 107 of checking that said values have been saved, possibly of checking that they are consistent, and possibly returns an error message 108.

The electric retraction and deployment stops are then corrected in a step 109 using a margin of error aimed at taking account of uncertainties in the measurements from the resolvers and the fact that the moving cowls have been brought into physical stop positions.

Thus, the position values corresponding to the retraction stop are increased very slightly while the position values corresponding to the deployment stop are decreased very slightly.

In the case of automatic calibration 112, the nacelle is given enough electrical power to actuate the jacks 6a, 6b electrically rather than simply to power the electronics.

During a step 113, the jacks 6a, 6b are powered in such a way as to be in the retracted position. A control loop 114 continuously checks whether the mechanical stop for closure of the reverser has been reached or whether the jacks 6a, 6b should continue to be retracted.

This detection of a mechanical stop may be performed, for example, by monitoring the speed of the electric motor 7 by differentiating the values returned by one or more resolvers or by getting the motor to monitor the motor supply voltage.

When the mechanical retraction stop is reached, the electric motor 7 is halted by a command 115. As before, the controller then logs the position values from the resolvers of each jack 6a, 6b during a step 116.

The electric motor 7 is then reversed to cause the jacks 6a, 6b to deploy during a step 117.

A control loop 118 continuously checks whether the mechanical deployment stop of the reverser has been reached or whether the jacks 6a, 6b should continue to be deployed.

When the mechanical deployment stop is reached, the electric motor 7 is halted by a command 119. As before, the controller then logs the position values from the resolvers of each jack 6a, 6b during a step 120.

The cycle may be ended by a step 121 of returning the reverser and the jacks 6a, 6b to the retracted position.

Once the deployed and retracted position values have been logged, the controller moves on to the step 107 of checking that said values have been saved.

The electric retraction and deployment stops are then corrected during the step 108 using a margin of error aimed at taking account of uncertainties in the measurements from the resolvers and the fact that the moving cowls have been brought into physical stop positions.

Although the invention has been described in conjunction with specific exemplary embodiments, it is quite obvious that it is not in any way restricted thereto and that it comprises all technical equivalents of the means described and combinations thereof where these fall within the scope of the invention.

The invention claimed is:

1. A method of self-calibration of a mobile cowl of a thrust reverser of a turbojet engine nacelle comprising at least one electric jack associated with at least one position-measuring member, the method comprising:
   bringing the mobile cowl and the associated jack or jacks into a retracted position, corresponding to a first position of the mobile cowl,
   setting up an electric stop by logging one or more position values of the associated jack or jacks returned by the position-measuring member or members in said retracted position,
   bringing the mobile cowl and the associated jack or jacks into a deployed position, corresponding to a second position of the mobile cowl, and
   setting up an electric stop by logging one or more position values of the associated jack or jacks returned by the position-measuring member in said deployed position, wherein the self-calibration is carried out during installation or maintenance operations such that in a flight operation, a deployed position and a retracted position of the associated jack or jacks are defined by said electric stops that are defined on the basis of actual mechanical stops of the mobile cowl and the associated jack or jacks.

2. The method as claimed in claim 1, wherein the jack or jacks are actuated manually.

3. The method as claimed in claim 1, wherein the jack or jacks are actuated electrically.

4. The method as claimed in claim 3, wherein the retracted and deployed positions of the jacks are detected automatically by detecting mechanical stops.

5. The method as claimed in claim 4, wherein the detection of the mechanical stops is performed by measuring variation in current drawn by an electric motor actuating the jack or jacks.

6. The method as claimed in claim 4, wherein the detection of the stops is performed by measuring a rate at which the jacks deploy or retract.

7. The method as claimed in claim 6, wherein the rate of deployment or of retraction is obtained by differentiating a position value returned by a position-measuring member.

8. The method as claimed in claim 1, wherein the position-measuring member is a resolver.

9. The method as claimed in claim 1, wherein the logged retracted and deployed position values are corrected by applying a margin of error.

10. A thrust reverser comprising at least one moving cowl that can be moved under action of at least one electromechanical member of the electric jack type, wherein it comprises an instrumentation and control interface capable of implementing a method as claimed in claim 1.

11. The reverser as claimed in claim 10, wherein the control interface is connected to a turbojet engine control unit and in the self-calibration method can be activated from a cockpit.

* * * * *